July 24, 1951          J. M. HILL          2,561,371
AIRPLANE MOORING ROPE SHACKLE
Filed Jan. 24, 1949
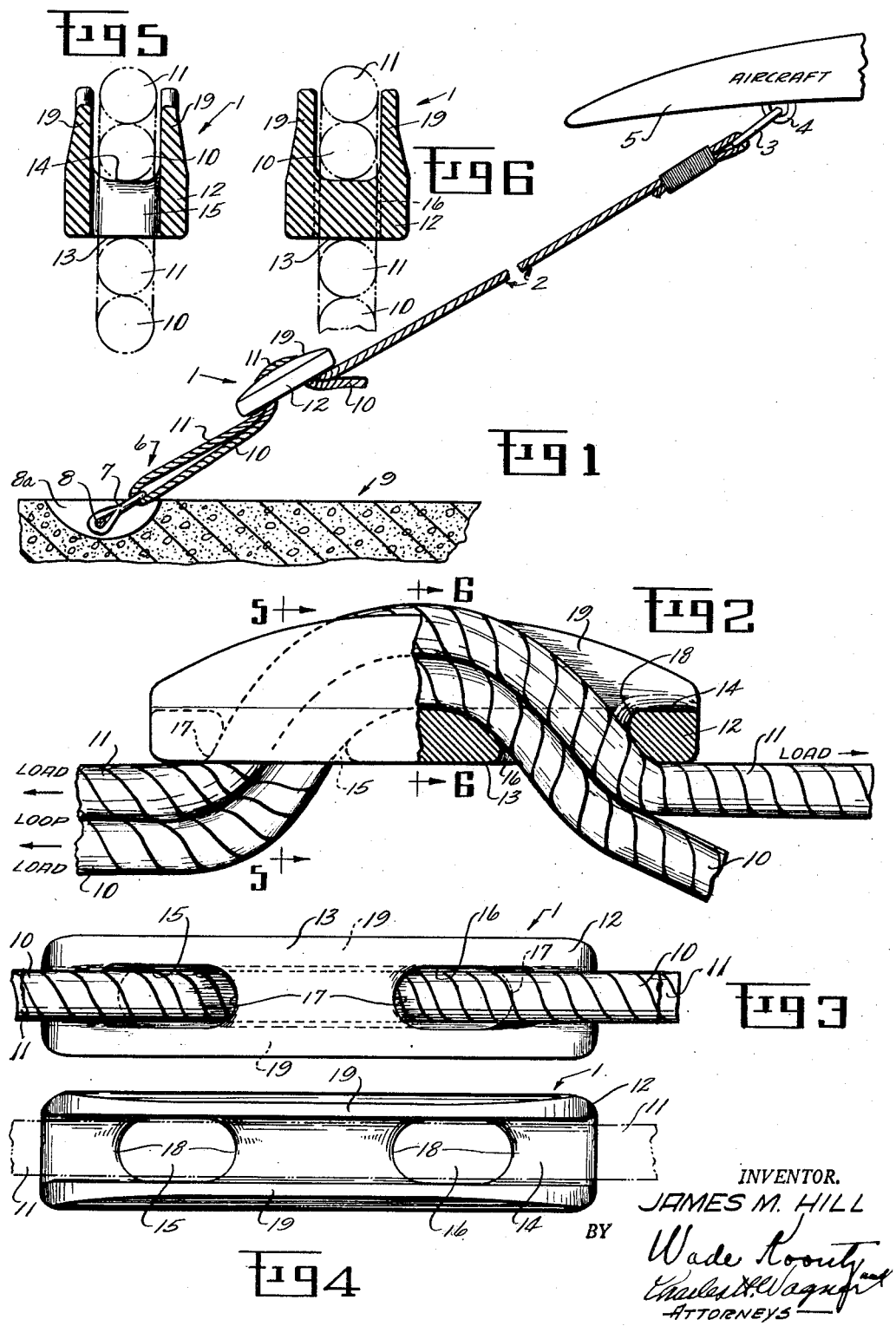
INVENTOR.
JAMES M. HILL
BY
Wade Koonty
Charles H. Wagner
ATTORNEYS Patented July 24, 1951

2,561,371

UNITED STATES PATENT OFFICE 2,561,371

AIRPLANE MOORING ROPE SHACKLE

James Miles Hill, San Antonio, Tex.

Application January 24, 1949, Serial No. 72,464

3 Claims. (Cl. 24—129)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to rope shackles or rope holders and more particularly to airplane mooring rope shackles, having for an object a simple and inexpensive one-piece rope holder which is applicable to a looped end of a rope, and easily loosened to adjust the free end of the loop, and securely tightens to secure the rope loop therein against slippage when load is applied to the rope.

A further object is the provision of an improved one-piece rope shackle or rope securing means, for application to aircraft mooring lines, to provide a simple and easily adjustable non-slip rope securing means, eliminating the necessity of tieing knots in the mooring lines and which is conveniently adjustable on the rope to vary the effective length of the mooring line.

A further object is the provision of a simple and inexpensive rope holder device that can be cast in one-piece and effectively used to secure the loop end of a rope against slippage, and does not require special machining or finishing of the rope engaging surfaces.

A still further object of my invention is the provision of a rope holding shackle device in which the rope will not seize or become wedged in the shackle after the application of load and can be easily and quickly adjusted therein or removed therefrom without binding when the load on the rope is removed.

A further object is the provision of a one-piece rope holding shackle element with integral rope guide means therein at opposite sides of the looped end of the rope when threaded through the shackle, to retain the stressed "reach" of the rope in the shackle over or above the free end of the loop to thereby hold the free end securely gripped against slippage so long as the load is applied to the rope.

Other objects and advantages will become apparent from the following description taken in connection with the accompanying drawings in which like reference characters refer to like parts in the several figures.

Fig. 1 is a somewhat diagrammatic side elevation of my improved holder or shackle device, as shown applied to the mooring line of an aircraft.

Fig. 2 is an enlarged side elevation of the rope holder as shown in Fig. 1, with the mooring line threaded therethrough, the right hand portion of the shackle being broken away and shown in section.

Fig. 3 is a bottom plan view of the shackle with the rope loop extending therethrough as shown in Fig. 2.

Fig. 4 is a top plan view of the shackle disclosed in Fig. 2, but with the mooring rope shown in phantom.

Figs. 5 and 6 are sectional views taken respectively, approximately on the planes indicated by lines 5—5 and 6—6 in Fig. 2, the rope being shown in phantom.

In the drawings my improved rope shackle or holder device is indicated generally at 1, and in Fig. 1 it is shown as applied to an aircraft mooring line or rope 2, having a detachable snap fastener 3 at its upper end, snapped into a mooring ring or eye 4 projecting from the aircraft's structure 5 which is to be moored or secured. In the illustration shown in Fig. 1 of the drawings the mooring eye 4 projects from the lower surface of the aircraft wing structure, diagrammatically shown, and partly broken away.

The other loop or adjustable end portion of the mooring line 2 is indicated at 6 and carries a rope shackle 7, or if preferred, a second snap hook, which is secured on an anchor bar 8 extending across a suitable opening 8a formed in the mooring apron or supporting surface, or runway for the aircraft structure 5.

The looped end 6 of the rope comprises, of course, a dead end portion 10 and a live end or load "reach" portion 11, which latter or load reach portion is utilized, when threaded through my improved holder 1, to securely engage and clamp the dead end portion of the rope 6 against the holder device 1.

The rope holder 1, is best seen in Figs. 2 to 6 and comprises an elongated block or body 12, having spaced parallel front and rear faces 13 and 14, the rear face 14 being interrupted intermediate its length by two longitudinally spaced elongated rope receiving openings or apertures 15 and 16, these apertures or openings extending completely through the block from the front face 13 to the rear face or side 14, with their axes substantially parallel to each other and perpendicular to the front face 13. The cross sectional area of each of the rope receiving openings 15 and 16 is preferably identical, each an elongated opening having its shorter or transverse dimension substantially equal to the diameter of the rope to be used with the holder, or only slightly greater than the rope diameter, so that the rope can be freely passed therethrough with the opposite sides of the rope in substantially close relation to the opposite sides of the apertures, preventing materially lateral displacement of the portion of the rope passing through the apertures.

The other "long" or longitudinal cross sectional dimension of each of the apertures is substantially twice the width of the apertures, or slightly greater than twice the diameter of the rope to be used so as to permit the live or reach end portion 11 to pass therethrough together with the dead end 10. The two openings 15 and 16 are "faired" or rounded adjacent the flat face 13 as indicated at 17, and also rounded at their juncture with the rear face 14 as indicated at 18, to provide a smooth entrance and exit for the rope loop and eliminate sharp shoulders that might cause excessive wear and chafing of the rope. The portion of the block 1 between the elongated openings 15 and 16 at the rear of the block is also rounded to permit easy adjustment of the looped portion of the rope and individual adjustment of the dead end portion when the load or tension is removed from the reach 11, thus permitting the effective length of the mooring line 2 to be easily adjusted as desired.

Integrally formed on the rear of the block 1 and projecting rearwardly from the rear face 14 along the opposite longitudinal edges of the block, in parallel relation to each other, are a pair of rope retainer flanges 19, 19, these flanges being spaced apart a distance about equal to the width of the elongated openings 15 and 16, or in other words slightly greater than the diameter of the rope to be used, so as to hold the two reaches of the rope loop in superimposed relation therebetween. The outer edges of the flanges 19, 19 are arched between their ends to provide a wide portion substantially midway between and above the adjacent ends of the elongated openings 15 and 16 so that the height of the two flanges at this point is substantially equal to twice the diameter of the rope, retaining the reaches of the dead and live ends of the loop in superimposed relation between the openings, also reenforcing the bar member 12 longitudinally. The flanges are slightly beveled outwardly at the sides of the block to eliminate excess material.

My improved rope holder may be made of any suitable material having sufficient strength to withstand a maximum tension load that may be applied on the rope but preferably I prefer to use metal such as aluminum, and cast the holder in one piece with the apertures formed therein. With a fairly smooth mold no machining or further finishing operations are found to be necessary, other than to remove any burs which might be present and engage, abrade or scuff the rope.

In the use of my improved rope holder the rope is first passed through one or the other of the rope openings 15 or 16 from the flat side 13 and then threaded through the other rope opening after which the mooring shackle 7 is placed on the rope. The rope is then looped back on itself and the dead end passed through the openings in the opposite order, preferably under the live end as shown in Fig. 2 of the drawing so that the tensioned reach of the loop lies across the block in the channel formed between the retainer flanges 19, 19 and over the dead end 10. When load is applied to the live end, the loop portions through the block tend to straighten, causing the dead end to be tightly and securely clamped against the block between the openings 15 and 16 and prevents slippage of the dead end, the flanges 19, 19 holding the clamped portion of the loop intermediate the apertures 15 and 16 in substantially superimposed relation and slippage will not occur even though the force applied exceeds the maximum tensile strength of the rope. When the rope loop is threaded through the openings from the flat side 13 as just set forth, with the dead end portion next to the bottom of the channel, between the retainer flanges 19, the live reach of the rope affects the clamping action of the dead end against the base of the channel between the flanges and between the adjacent ends of the two elongated rope openings 15 and 16, producing an effective nonslip action with the retainer flanges 19 holding the live reach in superimposed relation above the dead end, with the strands of the superimposed reaches of the loop forced into tight interlocking frictional engagement.

When the load on the rope is withdrawn the binding, clamping and holding actions are also eliminated and the holder can easily be adjusted or removed as desired, or the dead end of the loop can be freely adjusted to lengthen or shorten the effective length of the mooring line.

I claim:

1. In a rope holder device, an elongated block having substantially parallel front and rear faces at opposite sides thereof, a pair of rope retaining guide flanges projecting away from the block along the opposite edges of one of said faces in parallel relation to each other to form a rope retaining guide channel therebetween extending longitudinally along the last mentioned face, said rope channel having a depth substantially equal to twice the diameter of the rope to be used in the device and a width substantially less than twice the said rope diameter, said block having a pair of longitudinally spaced elongated rope receiving openings extending therethrough between the said faces and substantially perpendicular to said faces and opening into the base of said channel, said elongated openings each having a cross sectional dimension extending longitudinally of the block equal to at least twice the diameter of the rope to be used and a lesser transverse cross sectional dimension equal to at least the diameter of the rope to be used with the device but materially less than the greater cross sectional dimension aforesaid, whereby the looped end of a rope when threaded through one of the openings and across the block in the said rope retaining channel and out through the other opening with the free end of the loop under the load tensioned reach of the loop will be retained by said side flanges and the longer sides of the elongated opening with the free end of the loop clamped under the tensioned portion of the rope and against the holder device.

2. In a rope holder device for securing the free end of a rope loop against slippage, an elongated block having a pair of longitudinally spaced elongated rope receiving openings extending therethrough in substantially parallel relation to each other and perpendicular to the longitudinal dimension of the block, said block having a relatively deep rope retaining guide channel extending longitudinally along one side with said elongated openings in communication with the channel at the base of the channel, said guide channel having a depth between said openings equal to substantially twice the diameter of the rope to be used and a width equal to substantially the diameter of the rope, said elongated openings each having a greater cross sectional dimension extending parallel to the channel equal to substantially twice the diameter of the rope and a transverse cross sectional dimension equal to substantially the diameter of the rope to be used.

3. A rope loop dead end nonslip clamping device comprising a block having a pair of spaced substantially parallel elongated rope receiving openings extending therethrough and a rope receiving channel formed at one side of the block, opening outwardly away from the ends of the aforesaid openings, with the ends of the rope receiving openings in communication with the base of the channel, said channel and said openings having a cross sectional dimension transversely of the block, slightly exceeding the diameter of the rope to be passed through said openings and said channel and held by the device, said channel and said openings having cross sectional dimensions respectively from the base of the channel to its top and transversely across the openings longitudinally of the block, equal to substantially twice the diameter of the rope, whereby the side walls of the channel and side walls of the elongated rope receiving openings retain the looped end of a rope which has been passed through the openings and across the block in the channel, with the live end of the loop in superimposed relation relative to the dead end with the dead end clamped under the tensioned reach of the loop and tension on the rope exerts force on the dead end portion to displace the loop against the block and into non-slipping clamping relation between the block and the other or tensioned end of the rope.

JAMES MILES HILL.

REFERENCES CITED

The following references are of record in the file of this patent:

UNITED STATES PATENTS

| Number  | Name  | Date           |
|---------|-------|----------------|
| 590,591 | Purdy | Sept. 28, 1897 |
| 612,636 | Zusi  | Oct. 18, 1898  |
| 670,328 | Rigby | Mar. 19, 1901  |
| 912,387 | Landry| Feb. 16, 1909  |

FOREIGN PATENTS

| Number | Country       | Date          |
|--------|---------------|---------------|
| 22,334 | Great Britain | Oct. 1, 1912  |
| 25,699 | Norway        | Mar. 22, 1915 |